3,212,082
AIRCRAFT APPROACH AND LANDING SYSTEM

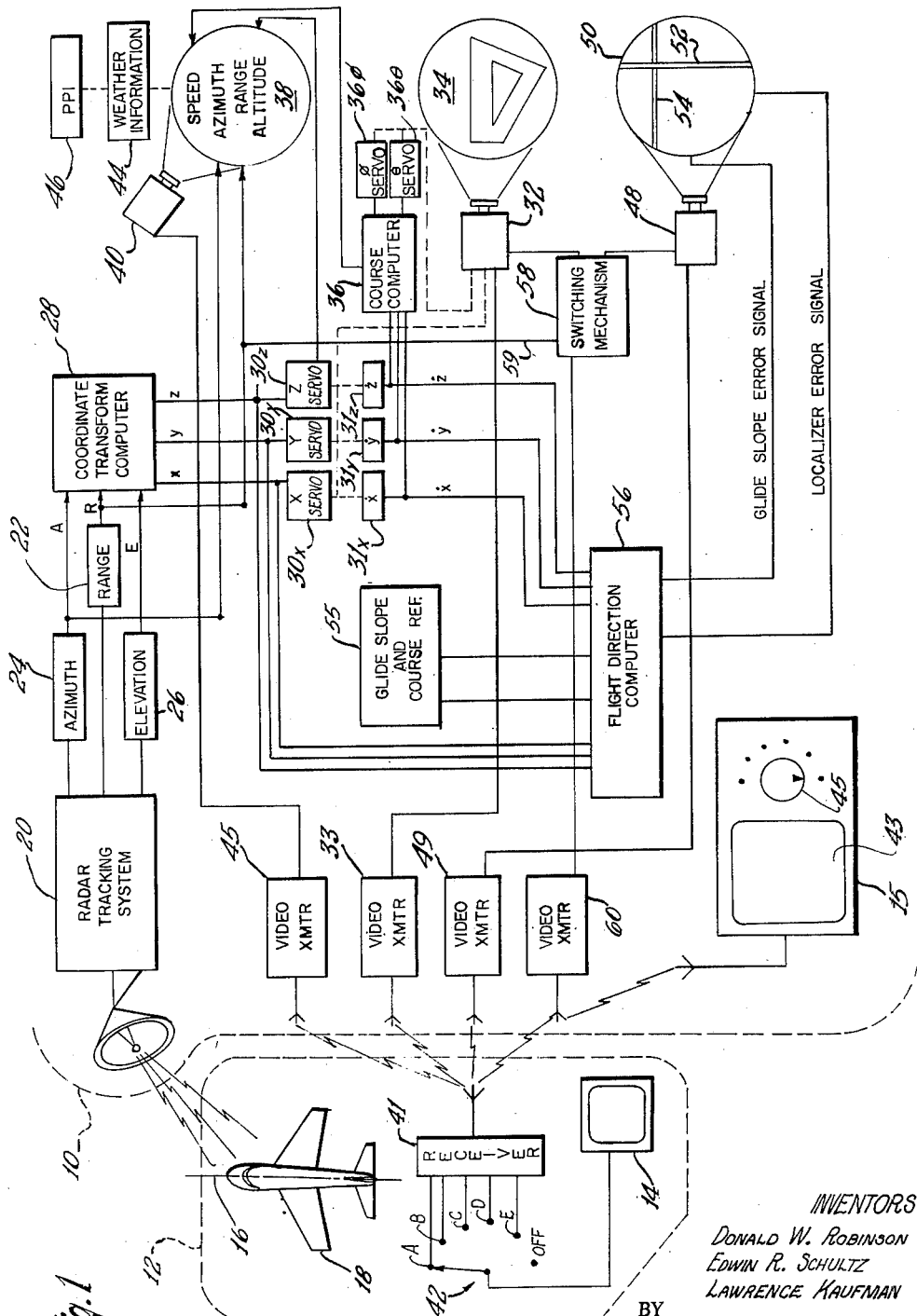

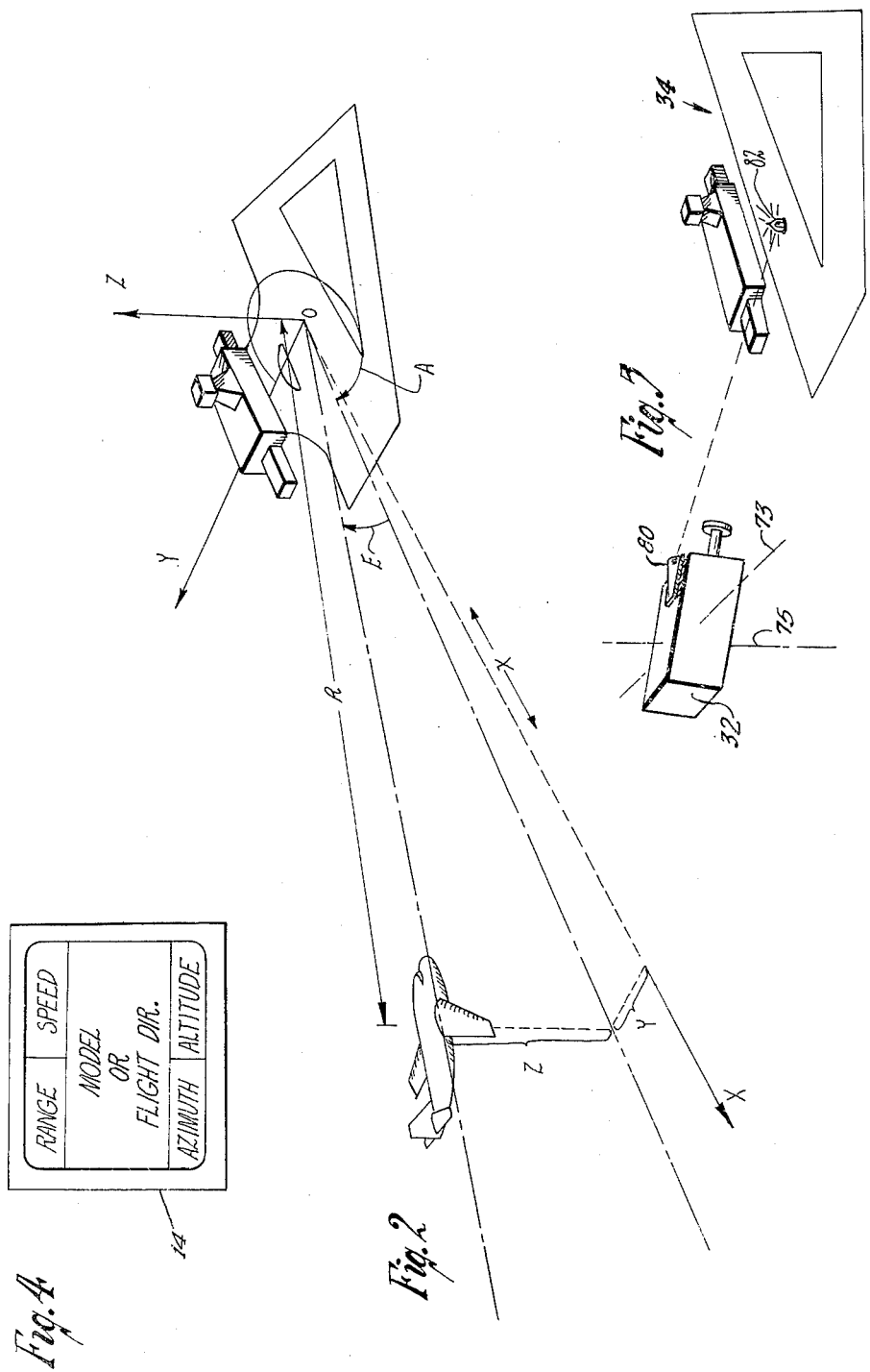

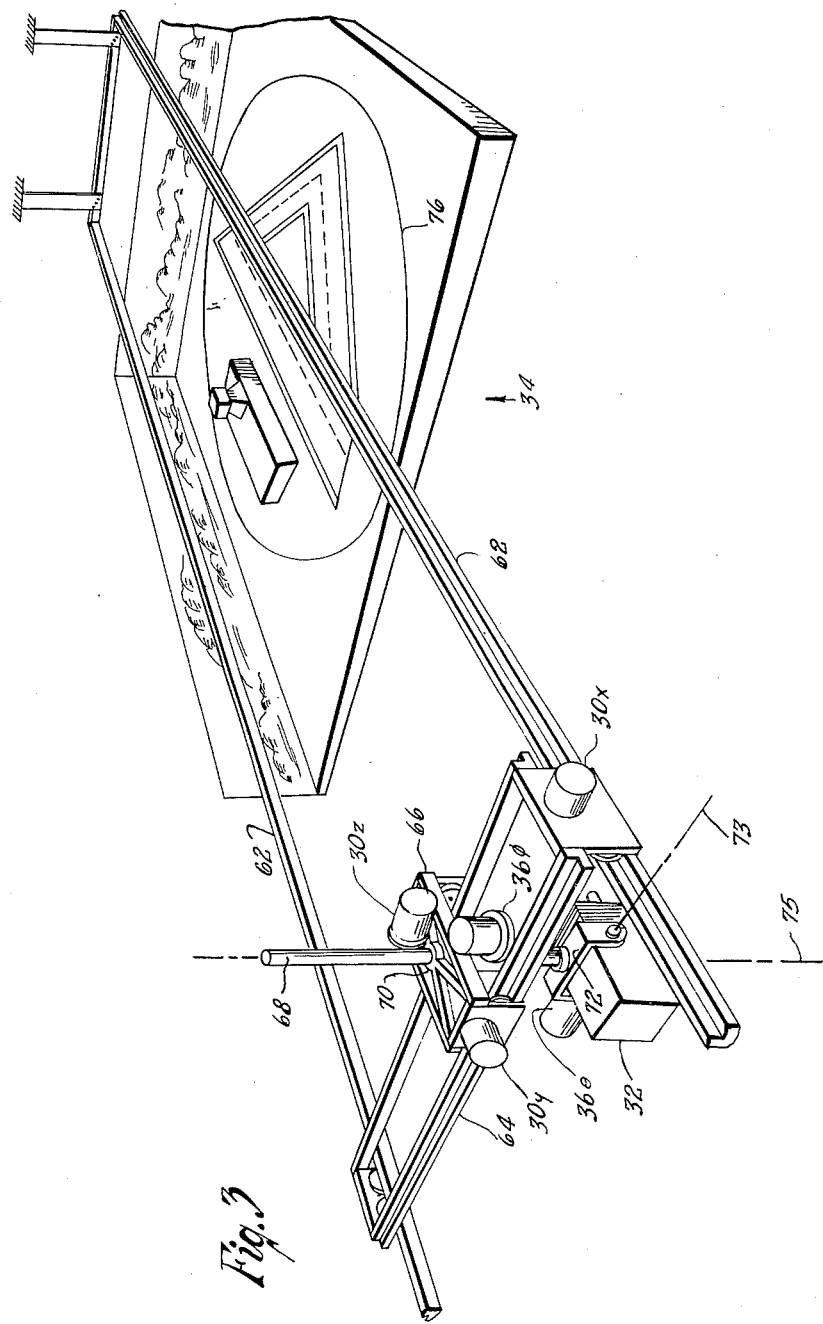

Donald W. Robinson, Jr., Hazardville, and Edwin R. Schultz and Lawrence Kaufman, West Hartford, Conn., assignors to Kaman Aircraft Corporation, Bloomfield, Conn., a corporation of Connecticut
Filed July 2, 1963, Ser. No. 292,382
12 Claims. (Cl. 343—6)

This invention relates to an aircraft approach and landing system, and deals more particularly with a system employing a video receiver in the cockpit of an aircraft on which is displayed sufficient visual information to enable the pilot to make an approach to a terminal equipped with cooperating ground-based tracking, computing and transmitting equipment.

Existing approach and landing systems are relatively inflexible in that the ground equipment required must be set up for a particular runway and for a particular approach path to that runway if extensive airborne equipment is to be avoided. The conventional ILS (instrument landing system) system requires an accurately calibrated localizer transmitter off the end of any runway to be used, as well as an equally critical glide path transmitter alongside this runway. These units in turn require two separate receivers in the aircraft, plus visual indicator means on the pilot's instrument panel to complete the system. The conventional GCA (ground controlled approach) system is somewhat more flexible in that the search and precision radar equipment are usually mounted on a portable trailer and may be quickly calibrated for use on alternate runways. However, in the GCA system, the pilot must rely on the radar operator to talk him down to a landing since he has no visual indication of aircraft position relative to the approach path or to the runway on which he intends to land. Thus, the GCA system gives the pilot no visual indication of aircraft position relative to either the runway or the approach path. The ILS system on the other hand requires extensive airborne and ground equipment to give the pilot an indication of his position relative to the approach path, and usually provides little information relative to his position in relation to the actual runway.

The present invention seeks to provide a system which overcomes or at least minimizes both of these disadvantages. Although the system of the present invention can be used in conjunction with these conventional approach systems, it is intended to function as a complete approach and landing system at landing areas and runways not equipped with either ILS or GCA systems.

One object of the present invention is to provide an approach and landing system for aircraft in which the pilot is not limited to a predetermined approach path, or even to a particular runway at the airport where he intends to land.

Another object of the present invention is to provide an approach and landing system in which the major portion of the system is ground based, the airborne portion thereof comprising only a television receiver.

Another object of the present invention is to provide a television receiver in the cockpit of an aircraft on which the pilot has a continuous visual indication of his aircraft's position relative to the runway or the like on which he intends to land.

Another object of the present invention is to provide a television receiver in the cockpit of an aircraft on which the pilot has a continuous visual indication of his aircraft's position relative to any one of a variety of approach paths to a particular landing area.

Another object of the present invention is to provide a television receiver in the cockpit of an aircraft on which the pilot has a continuous indication of his aircraft's position relative to a predetermined approach path at ranges above a certain value and on which the pilot has a continuous visual indication of his aircraft's position relative to the runway itself when the aircraft's range has decreased beyond a particular value.

Another object of the present invention is to provide means for presenting both of the above indications on a single television screen for at least a portion of the aircraft's approach and landing, the intensity of each being related to the aircraft's range in such a manner that the pilot's transition from the one to the other is greatly facilitated.

Another object of the present invention is to provide a television receiver in the cockpit of an aircraft on which other information may be presented to the pilot as an aid in planning his approach.

In accordance with the present invention, a television camera is supported over a scale model of the airport or other landing area at which the pilot intends to land. The camera is linked to a ground-based tracking radar system and coordinate position signals produced by the tracking radar position the camera in the same relation to the model airport as the aircraft bears to the actual airport. In addition, the camera is adapted to being rotated about a pitch axis and an azimuth axis in response to the time rate of change of the position signals, so as to be continuously aimed at a spot on the model corresponding to the point on the ground at which the aircraft would touch down if the instantaneous rate signals remained constant. The image viewed by the television camera is transmitted to the approaching aircraft where it is displayed on a television screen in front of the pilot.

The drawings show preferred embodiments of the invention and such embodiments will be described, but it will be understood that various changes may be made from the constructions disclosed, and that the drawings and description are not to be construed as defining or limiting the scope of the invention, the claims forming a part of this specification being relied upon for that purpose.

Of the drawings:

FIG. 1 is a block diagram of a preferred embodiment of the present invention.

FIG. 2 is a perspective view of the actual airport and an approaching aircraft illustrating the coordinate systems employed.

FIG. 3 is a perspective view of the model airport and the movable camera.

FIG. 4 is a plan view of the display screen of a television receiver employed in an alternative embodiment of the invention.

FIG. 5 is a fragmentary perspective view of a camera and model utilizing parts of an alternative construction of the range responsive switching means.

Referring now to the drawings, FIG. 1 illustrates in schematic block diagram form the ground-based equipment 10 and the airborne equipment 12 which together comprise a preferred embodiment of the present invention. The airborne equipment includes a television screen 14 which may be fixed in the cockpit or which may if desired be rotatably supported for movement about a roll axis 16 extending longitudinally of the aircraft 18 and gyro-stabilized about said axis. A multi-channel receiver 41 is provided in the aircraft and includes a selector switch 42 which can be manipulated by the pilot to select any one of a variety of channels for display on the screen, each channel containing a different type of information transmitted to the aircraft from the ground station.

The ground-based equipment 10 includes a radar tracking system 20 which detects the position of the approaching aircraft and produces range, azimuth and elevation signals appearing respectively as output signals from the illustrated devices 22, 24 and 26, and corresponding to the range, azimuth and elevation of the aircraft with respect to the place of intended landing. Referring more particularly to FIG. 2, if O represents the intended landing point, then the output from the device 22 represents the range R, the output from the device 24 represents the azimuth A, and the output from the device 26 represents the elevation E. These signals are in turn fed into a coordinate transformation computer 28 which operates to transform the three input signals into three other signals representing the position of the aircraft in a three-dimensional Cartesian coordinate system having its origin at the point O. As shown in FIGS. 1 and 2, these three signals may be identified as $x$, $y$ and $z$ signals where the $x$ signal represents the displacement of the aircraft from the point O as measured along a horizontal X axis, the $y$ signal represents the displacement of the aircraft from the point O as measured along a horizontal Y axis perpendicular to the X axis, and the $z$ signal represents the displacement of the aircraft along a vertical Z axis perpendicular to the X and Y axes. The $x$, $y$ and $z$ signals are in turn fed into camera positioning servos 30$x$, 30$y$ and 30$z$ respectively, which servos are mechanically linked to a television camera 32 so as to cause the camera to be positioned and moved in relation to the model 34 of the landing area in the same manner as the actual aircraft is positioned and moved in relation to the actual landing area.

Also included in the system is a means for determining the rate of change of the $x$, $y$ and $z$ signals. This means may take various different forms and may comprise part of the computer 28. In the illustrated case, however, this means conveniently comprises three tachometers 31$x$, 31$y$ and 31$z$ which are driven respectively by the outputs of the camera positioning servos 30$x$, 30$y$ and 30$z$ to produce rate signals $\dot{x}$, $\dot{y}$ and $\dot{z}$. These rate signals are fed into a course computer 36 which generates angular orientation signals $\phi$ and $\theta$. These orientation signals are in turn fed into camera orientation servos 36$\phi$ and 36$\theta$ respectively. The latter servos are mechanically linked to the television camera 32. The servo 36$\phi$ is adapted to turn the camera about a vertical or azimuth axis and the servo 36$\theta$ is adapted to turn the camera about a horizontal or pitch axis perpendicular to the azimuth axis. The $\phi$ and $\theta$ signals fed into the latter servos are such as to cause the camera to be continuously oriented and aimed at a spot on the model 34 which represents the spot on the ground at which the aircraft would touch down if the instantaneous rate signals $\dot{x}$, $\dot{y}$ and $\dot{z}$ were to remain unchanged. The video signal from camera 32 is transmitted by a video transmitter 33 to the airborne receiver 41 for presentation to the pilot on the screen 14 when his selector switch 42 has been rotated to the appropriate channel which may be taken to be the channel A.

The course computer 36 also generates a speed signal related to the magnitude of the vector sum of the individual rate signals $\dot{x}$, $\dot{y}$ and $\dot{z}$. This speed signal together with azimuth (A signal), range (R signal) and altitude ($z$ signal) information are visually displayed by a suitable readout device 38 either numerically or otherwise in the field of view of an information camera 40. The image picked up by the information camera 40 is converted into a video signal and transmitted over a second channel to the airborne receiver 41 by an associated transmitter 45. This channel may be taken to correspond to the position B of the selector switch 42 and therefore when the pilot turns the switch to this position, the speed, azimuth, range and altitude information are presented on the screen 14. In addition, weather information as provided on a readout device 44 may, if desired, also be scanned by the information camera 40 for presentation along with the information appearing on the device 38. If desired, this weather information could be scanned by a separate camera and comprise a separate channel of information transmitted to the aircraft. Similarly, the camera 40 may also be used to scan the display screen of a plan position indicator type of radar system, indicated at 46, for presentation along with the other information appearing on the device 38 and/or the device 44; or, if desired, a separate camera and a separate transmission channel and transmitter may be used in conjunction with the PPI display.

In accordance with the embodiment of the invention shown in FIG. 1, another fixed camera 48 is continuously aimed at a flight director indicator device 50. This device may take various different forms, but as shown comprises mutually perpendicular cross pointers 52 and 54 which function in a manner similar to the localizer and glide slope needles of a conventional flight director instrument located in the cockpit of an aircraft. The flight director device 50 may in fact be such a conventional device with the exception of its being located on the ground rather than in the aircraft. The localizer needle 52 is vertically oriented and adapted to move horizontally across the face of the instrument in response to a localizer error signal fed into the instrument 50 by a flight director computer 56. The glide slope needle 54 is oriented horizontally and adapted to move vertically across the face of the instrument in response to a glide slope error signal also produced by the computer 56. In connection with the localizer needle 52, the computer 56 compares the actual azimuth of the approaching aircraft to a desired azimuth as provided by the reference device 55 and in response to the comparison, generates the localizer error signal. In a similar fashion, the computer compares the actual glide path of the aircraft with that provided by the reference device 55 and as a result of the comparison produces a glide slope error signal to operate the glide slope needle 54. It will be apparent that any number of approach paths can be accommodated by a system of this design, and as a further refinement the system may include automatic means (not shown) on the aircraft for selecting and using a particular approach path stored in the reference device 55. Also, the use of the ground-based flight director allows or facilitates the utilization of a "quickened" display, that is one in which the needles of the flight director not only respond to the localizer and glide slope displacement error, but to the rate of change of error as well; these two signals being added in some preferred proportion. In this arrangement, the needles are centered whenever the proper maneuver is being performed, even in instances where the aircraft is not yet at the center of the desired path. "Quickening" is relatively difficult to achieve in airborne installations, since the error rate signals must be computed, but in this invention, it is obtained very simply from the $x$, $y$, and $z$ coordinate information generated on the ground.

The flight director presentation scanned by the fixed camera 48 is converted into a video signal and transmitted to the airborne receiver over a separate channel by a separate transmitter 49. This channel may be taken to be the channel corresponding to the position C of the pilot operable selector switch 42. From the foregoing, it will therefore be seen that the pilot, by switching the switch 42 between its positions B and C, may select for presentation on the screen 14 either the image of the scale model picked up by the camera 32 or the image of the flight director picked up by the camera 48.

In accordance with another aspect of the invention, means are provided whereby the pilot may select a mode of operation wherein the display presented on the airborne screen 14 is such that as the aircraft approaches, but is still a considerable distance from, the landing area the cross pointer information of the flight director device 50 is displayed, this information being thereafter replaced automatically by a representation of the landing area and the point of impact as provided by the model 34 and camera 32. The transition from one presentation to another may be made to occur gradually and include a phase during which both presentations are displayed or it may occur rapidly with the one presentation suddenly replacing the other as the aircraft comes within a certain distance of the landing area. In the system shown in FIG. 1, this means comprises a switching mechanism 58 and an associated video transmitter 60. The mechanism 58 receives inputs from both of the cameras 32 and 48 and is controlled by the range signal R appearing as another input on the line 59. More particularly, the operation of the device 58 is such that depending on the value of the range signal R, either one or both of the video signals picked up by the cameras 32 and 48 will be transmitted to the transmitter 60 for subsequent transmission to the airborne receiver. As mentioned, the switching mechanism 58 may operate to transmit the signal picked up by the fixed camera 48 to the transmitter 60 when the range signal R corresponds to location of the aircraft at some distance from the intended landing area and to gradually replace the latter signal with the signal from the camera 32 as the aircraft moves closer to the landing area. During the intermediate phase at which both images are transmitted to the transmitter 60, the mechanism 58 operates to control the intensity of the images such that as the aircraft moves nearer to the landing area, the image of the model landing area, as displayed on the airborne screen 14, will become brighter and the image of the flight director will become less bright and gradually disappear. In this manner, the pilot's transition from the flight director information to the model landing area information will be greatly facilitated. As an alternative to this form of operation, the switching mechanism 58 may also operate to suddenly switch the transmitter 60 from the camera 48 to the camera 32 as the aircraft passes within a given distance of the landing area. In this regard, it should be noted that, as hereinafter described in more detail, the movement of the camera 32 relative to the model 34 has definite physical limits, and that the image picked up by the camera will have relevancy only when the camera is located within such limits. That is, when the analogue position of the aircraft is outside of the limits of the movement of the camera 32, the camera 32 is incapable of being operated to supply useful information to the pilot. Therefore, regardless of the manner in which the switching mechanism 58 operates, it is desirable that the camera 48 be utilized to supply flight director information for at least so long as the aircraft is located outside of the range of useful operation of the camera 32. The video signal transmitted by the transmitter 60 is transmitted on a frequency channel separate from those of the other transmitters and may be taken to correspond to the position E of the selector switch 42.

FIG. 5 shows an alternative means for controlling the operation of the switching mechanism 58. Referring to this figure, the controlling means therein illustrated includes a photo-sensitive device 80 mounted on the camera 32 in such a manner as to receive substantially the same light rays as received by the lens of the camera. Co-operating with the photo-sensitive device 80 is a light source such as a small lamp 82 located on the model at the center of the intended landing area. From this it will therefore be seen that the amount of light picked up by the photo-sensitive device 80 from the lamp 82 will be dependent on the distance of the camera 32 from the intended landing area. Therefore, the output signal produced by the photo-sensitive device is a measure of the distance of the camera from the intended landing area on the model and may be used to control the switching mechanism 58 in the same manner as the range signal R of the FIG. 1 system.

With further reference to FIG. 1, a ground-based means is provided for monitoring the signals transmitted to an approaching aircraft. As shown, this means comprises a television receiver 15 having a screen 43 and a channel selector switch 45 similar to the airborne screen 14 and switch 42 respectively. This operation may be accomplished in much the same manner as in the conventional GCA system. In the event of failure of the airborne television receiver, the ground monitor receiver 15 may be used in conjunction with the normal voice communication system to supply the ground controller with information for vocal transmission to the incoming aircraft.

Referring with greater particularity to the model of the landing area 34 shown in FIG. 3, this portion of the system is an accurate three-dimensional replica, in miniature, of the actual landing area. As shown, the landing area comprises an airport having three runways and a terminal building which includes a control tower. In general, the more detailed the replica or model, the more useful it is to the pilot of an approaching aircraft. In this connection, several refinements or alternatives to the illustrated model will be evident. First, the model may be equipped with any combination of runway approach lights to aid the pilot in executing an approach even though such lights may not be present in the actual landing area itself. Additionally, the model may be equipped with simulated marker beacons at predetermined ranges along a particular approach path to a runway or the like and again the beacons may be provided on the model even though not present on the actual landing area. FIG. 3 also shows in some detail the mechanism for positioning the camera 32 relative to the model. Referring again to this figure, parallel rails 62, 62 extend in the X direction and are supported by suitable means above the model. The model 34 is oriented beneath said rails so that the runway of intended landing is generally aligned with the rails. An X carriage 64 is adapted to travel along these rails 62, 62 providing movement of the camera in the X direction. The said X carriage provides support for a smaller Y carriage 66 which is adapted to being driven along the X carriage in the Y direction providing movement of the camera in said Y direction. Z direction movement of the camera is achieved by mounting the camera 32 on a vertical jackscrew 68 which is slidably received in a tubular member 70 rigidly attached to said Y carriage 66. The servo motor $30z$ is mounted on the Y carriage and is adapted to drive the jackscrew 68 and the camera 32 attached to the other end thereof in the vertical direction. The servo motor $30y$ is also carried by the Y carriage and engages a rack on the X carriage 64 to drive the Y carriage 66 in the Y direction. The servo motor $30x$ is carried by the X carriage 64 and engages a rack associated with the rails 62, 62 to drive the carriage 64 in the X direction. Also carried by the X carriage 64 is the servo motor $36\phi$ which is adapted through suitable mechanism to rotate the jackscrew 68 about its vertical axis 75. On the lower end of the jackscrew is a yoke 72 which supports the camera 32 for movement about a horizontal axis 73 perpendicular to the axis 75. Carried by the yoke 72 is the servo motor $36\theta$ which is adapted to rotate the camera about the axis 73. The two axes 73 and 75 are in turn both perpendicular to the principal axis of the camera lens system. The axis 75 therefore corresponds to the vertical or azimuth axis hereinbefore referred to and the axis 73 to the horizontal or pitch axis.

Still with reference to FIG. 3, the three-dimensional model airport 34 is shown constructed upon a turntable 76. As so arranged, the model may be rotated with respect to the X rails 62, 62 so as to align any one of the several runways of the landing facility with the longitudinal extent of the X rails. With this arrangement, the illustrated system may be used regardless of the direction from which an aircraft approaches the landing area and without the use of a camera supporting means permitting the camera to be moved to great distances from the model in all directions.

In addition to the types of presentation afforded by the system of FIG. 1, it will be obvious that other methods of presentation may be utilized if desired. For example, the aircraft may be provided with two or more receivers and screens for simultaneously displaying two or more channels of information. One screen may display the scale model representation and another the speed, azimuth, range and altitude information. Similarly, in another modification of the system, information scanned by two or more ground-based cameras may be combined by suitable means prior to transmission to the aircraft and there presented as a composite picture on the single screen 14. FIG. 4, for example, shows one manner in which such composite information may be presented. In this illustration, the scale model representation is located on the center portion of the screen and the range, speed, azimuth and altitude information is presented on marginal portions of the screen.

The invention claimed is:

1. A landing system for aircraft, said system comprising ground-based aircraft tracking equipment, a scale model of the area at which an approaching aircraft is to land, a television camera, means for positioning said camera relative to said model in response to signals produced by said tracking equipment so that said camera occupies a position relative to said model which is analogous to the position of said approaching aircraft relative to the landing area, means for orienting said camera in response to signals produced by said tracking equipment so that said camera is aimed at a spot on said model representing the place at which said aircraft will touch down if the rate of movement of said aircraft in all directions remains unaltered, and means including a ground-based television transmitter means and a television receiving means in said aircraft for presenting the image viewed by said camera to the pilot of said aircraft.

2. The landing system defined in claim 1 further characterized by a ground-based means for converting the signals produced by said tracking equipment into other information useful to the pilot of said approaching aircraft, and means for converting said other information into a video signal for transmission to said approaching aircraft.

3. A landing system for aircraft, said system comprising ground-based aircraft tracking equipment, a scale model of the area at which an approaching aircraft is to land, a television camera, means for positioning said camera relative to said model in response to coordinate aircraft position signals produced by said tracking equipment so that said camera occupies a position relative to said model which is analogous to the position of the approaching aircraft relative to the landing area, means for orienting said camera about two mutually perpendicular axes in response to the time rate of change of said coordinate position signals so that said camera is aimed at a spot on the model representing the place at which the aircraft will touch down if said rate signals remains unaltered, and means including a ground-based television transmitter means and a television receiving means in said aircraft for presenting the image viewed by said camera to the pilot of said aircraft.

4. The landing system defined in claim 3 further characterized by a ground-based means for converting said signals produced by said tracking equipment into a visual presentation of other information useful to the pilot of said approaching aircraft, and television means for viewing said visual presentation and for transmitting the same to said approaching aircraft for presentation to said pilot.

5. The landing system defined in claim 4 further characterized by said television receiving means in said aircraft including a single display screen and pilot operable means for selectively presenting either said scale model presentation or said other information presentation on said screen.

6. The landing system defined in claim 4 further characterized by said television receiving means in said aircraft including a single display screen, said scale model presentation being displayed on one portion of said screen and said other information presentation being displayed on another portion of said screen.

7. The aircraft landing system defined in claim 3 further characterized by a ground-based flight director device responsive to signals produced by said tracking equipment for visually presenting a representation of the actual aircraft position relative to a predetermined flight path, and television means for viewing said visual presentation and for transmitting the same to said approaching aircraft for presentation to said pilot.

8. A landing system for aircraft, said system comprising ground-based aircraft tracking equipment, a scale model of the area at which an approaching aircraft is to land, a first television camera, means for positioning said camera relative to said model in response to coordinate aircraft position signals produced by said tracking equipment so that said camera occupies a position relative to said model which is analogous to the position of the approaching aircraft relative to the landing area, means for orienting said camera about two mutually perpendicular axes in response to the time rate of change of said coordinate position signals so that said camera is aimed at a spot on the model representing the place at which the aircraft will touch down if said rate signals remain unaltered, a ground-based flight director device for visually presenting a representation of the actual aircraft position relative to a predetermined flight path, a second television camera arranged to view the said visual presentation of said flight director device, a television transmitter, means including a switching mechanism for connecting the outputs of said two cameras to said transmitter for transmission to said approaching aircraft, and means including a television receiver in said aircraft for receiving and presenting in visual form the signal transmitted by said transmitter, said switching mechanism being operable to connect either one of said camera outputs to said transmitter independently of the other output.

9. A landing system as defined in claim 8 further characterized by means controlling the operation of said switching mechanism in response to a signal representing the range of said approaching aircraft from said landing area and in such a manner that a representation of the flight director as viewed by said second camera is presented to said pilot when said aircraft is located beyond a predetermined range of said landing area and a representation of the scale model as viewed by said first camera is presented to said pilot when said aircraft is located within a predetermined range of said landing area.

10. A landing system as defined in claim 9 further characterized by said means for controlling the operation of said switching mechanism including a light-emitting element and a light-sensitive element, one of said latter elements being located on said scale model at the point representing the intended landing area and the other of said elements being located on said first camera.

11. A landing system for aircraft, said system comprising ground-based tracking radar equipment capable of providing continuous azimuth, range and elevation position information signals relative to an approaching aircraft, computer means for transforming said latter signals into three electrical signals representing the displacement of said aircraft from an intended landing point as measured respectively along the three axes of a Cartesian coordinate system having its origin at said intended landing point, a television camera, a scale model of the area at which an approaching aircraft is to land, means for positioning said camera relative to said model in response to said Cartesian coordinate signals so that said camera occupies a position relative to said model which is analogous to the position of the approaching aircraft relative to the landing area, means for producing three rate signals representing the rate of change of the position of said aircraft as measured respectively along said three Cartesian coordinate axes, means responsive to said rate signals for orienting said camera about mutually perpendicular axes so that said camera is aimed at a spot on said model representing the place at which said aircraft will touch down if the rate of movement of said aircraft in all directions remains unaltered, and means including a ground-based television transmitter means and a television receiving means in said aircraft for presenting the image viewed by said camera to the pilot of said aircraft.

12. A landing system for aircraft, said system comprising ground-based tracking radar equipment capable of providing continuous azimuth, range and elevation position information signals relative to an approaching aircraft, computer means for transforming said latter signals into three electrical signals representing the displacement of said aircraft from an intended landing point as measured respectively along the three axes of a Cartesian coordinate system having its origin at said intended landing point, a television camera, a scale model of the area at which an approaching aircraft is to land, three servo mechanisms for positioning said camera relative to said model in response to said Cartesian coordinate signals so that said camera occupies a position relative to said model which is analogous to the position of the approaching aircraft relative to the landing area, each of said servo mechanisms being responsive to a respective one of said three Cartesian coordinate signals and operable to position said camera along the associated Cartesian coordinate axis, three tachometers each driven by a respective one of said servo mechanisms for producing three rate signals representing the rate of change of the position of said aircraft as measured respectively along said three Cartesian coordinate axes, means responsive to said rate signals for orienting said camera about two mutually perpendicular axes so that said camera is aimed at a spot on said model representing the place at which said aircraft will touch down if the rate of movement of said aircraft in all directions remains unaltered, and means including a ground-based television transmitter means and a television receiving means in said aircraft for presenting the image viewed by said camera to the pilot of said aircraft.

References Cited by the Examiner
UNITED STATES PATENTS

| | | | |
|---|---|---|---|
| 2,062,003 | 11/36 | Hammond | 343—6 |
| 2,459,481 | 1/49 | Wolff et al. | 343—6 |
| 2,490,268 | 12/49 | Herbst | 343—6 |
| 2,520,600 | 8/50 | Jones | 343—6 |
| 2,528,202 | 10/50 | Wolff | 343—6 |
| 2,655,650 | 10/53 | Marshall | 343—6 |
| 2,959,779 | 11/60 | Miller et al. | 343—6 |
| 3,111,664 | 11/63 | Gamertsfelder et al. | 343—6 |

CHESTER L. JUSTUS, *Primary Examiner.*